United States Patent
Hewitt et al.

(10) Patent No.: US 6,865,618 B1
(45) Date of Patent: Mar. 8, 2005

(54) SYSTEM AND METHOD OF ASSIGNING DEVICE NUMBERS TO I/O NODES OF A COMPUTER SYSTEM

(75) Inventors: Larry D. Hewitt, Austin, TX (US); Paul C. Miranda, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 511 days.

(21) Appl. No.: 10/113,133

(22) Filed: Mar. 29, 2002

(51) Int. Cl.[7] .......................... G06F 3/00; G06F 13/36
(52) U.S. Cl. ............................. 710/3; 710/9; 710/10; 710/306; 713/1
(58) Field of Search ......................... 710/3, 9, 10, 52, 710/305, 306; 713/1; 709/224

(56) References Cited

U.S. PATENT DOCUMENTS

| 5,761,448 A | | 6/1998 | Adamson et al. | |
|---|---|---|---|---|
| 6,397,268 B1 | | 5/2002 | Cepulis | |
| 6,473,797 B1 | * | 10/2002 | Hirasawa | 709/224 |
| 6,691,185 B2 | * | 2/2004 | Avery | 710/52 |
| 6,757,755 B2 | * | 6/2004 | Askar et al. | 710/52 |
| 6,760,838 B2 | * | 7/2004 | Owen et al. | 713/1 |
| 2003/0182487 A1 | * | 9/2003 | Dennis et al. | 710/305 |

FOREIGN PATENT DOCUMENTS

| JP | 2000010902 A | * | 1/2000 | ............ G06F/13/14 |

* cited by examiner

*Primary Examiner*—Glenn A. Auve
*Assistant Examiner*—Christopher E. Lee
(74) *Attorney, Agent, or Firm*—Meyertons Hood Kivlin Kowert & Goetzel, P.C.; Stephen J. Curran

(57) ABSTRACT

A system and method of assigning device numbers to a plurality of I/O nodes of a computer system. Each of the plurality of input/output nodes is initialized to a common default device number. The method includes assigning a unique device number such as a Unit ID, for example, to each one of the input/output nodes. The method may also include determining whether any one of the input/output nodes includes a graphics port. The method may further include reassigning the default device number to a particular one of the input/output nodes in response to determining that the particular one of the input/output nodes a graphics port.

35 Claims, 4 Drawing Sheets

SYSTEM AND METHOD OF ASSIGNING DEVICE NUMBERS TO I/O NODES OF A COMPUTER SYSTEM

BACKGROUND OF THE INVENTION

1. Field of the Invention

This invention relates to computer system nodes and, more particularly, to assignment of device identification numbers within an input/output node.

2. Description of the Related Art

In a typical computer system, one or more processors may communicate with input/output (I/O) devices over one or more buses. The I/O devices may be coupled to the processors through an I/O bridge which manages the transfer of information between a peripheral bus connected to the I/O devices and a shared bus connected to the processors. Additionally, the I/O bridge may manage the transfer of information between a system memory and the I/O devices or the system memory and the processors.

Unfortunately, many bus systems suffer from several drawbacks. For example, multiple devices attached to a bus may present a relatively large, electrical capacitance to devices driving signals on the bus. In addition, the multiple attach points on a shared bus produce signal reflections at high signal frequencies which reduce signal integrity. As a result, signal frequencies on the bus are generally kept relatively low in order to maintain signal integrity at an acceptable level. The relatively low signal frequencies reduce signal bandwidth, limiting the performance of devices attached to the bus. An example of a shared bus used by I/O devices is a peripheral component interconnect (PCI) bus or an extended PCI (PCI-X) bus.

To overcome some of the drawbacks of a shared bus, some computer systems may use packet-based communications between devices or nodes. In such systems, nodes may communicate with each other by exchanging packets of information. In general, a "node" is a device which is capable of participating in transactions upon an iterconnect. For example, the interconnect may be packet-based, and the node may be configured to receive and transmit packets. Generally speaking, a "packet" is a communication between two nodes: an initiating or "source" node which transmits the packet and a destination or "target" node which receives the packet. When a packet reaches the target node, the target node accepts the information conveyed by the packet and processes the information internally. A node located on a communication path between the source and target nodes may relay or forward the packet from the source node to the target node.

Additionally, there are systems that use a combination of packet-based communications and bus-based communications. For example, a system may connect to a PCI bus and a graphics bus such as an accelerated graphics port (AGP). The PCI bus may be connected to a packet bus interface that may then translate PCI bus transactions into packet transactions for transmission on a packet bus. Likewise the graphics bus may be connected to an AGP interface that may translate AGP bus transactions into packet transactions. Each interface may communicate with a host bridge associated with one of the processors or in some cases to another peripheral device.

In many systems, device configuration may be handled by the operating system or the basic input/output system (BIOS) at system start up. Devices may have configuration registers which may occupy locations within the configuration space of the system. The registers are commonly referred to as configuration space registers (CSR). In some devices, a device number may be defined in one of the fields of a given CSR. Further, the device number may be assigned during initialization.

Certain legacy operating systems may require certain device numbers to be allocated to particular devices. Thus, depending on the configuration of the nodes and the operating system used by the computer system, the nodes may be designed to be legacy compatible.

SUMMARY OF THE INVENTION

Various embodiments of a system and method of assigning device numbers to a plurality of I/O nodes of a computer system are disclosed. In one embodiment, each of the plurality of input/output nodes is initialized to a common default device number. The method may include assigning a unique device number such as a Unit ID, for example, to each one of the input/output nodes. The method may also include determining whether any one of the input/output nodes includes a graphics port. The method may further include reassigning the default device number to a particular one of the input/output nodes in response to determining that the particular one of the input/output nodes includes a graphics port.

In one specific implementation, the reassignment of the default device number is performed after the assignment of a unique device number to each one of the input/output nodes. In addition, each of the input/output nodes may be arranged in a chain and assigning the unique device number to each of the input/output nodes may include writing the unique device number to each successive input/output node in the chain which responds to a read request to an input/output node having the default device number.

In another specific implementation, each of the input/output nodes may include a register configured to store a value corresponding to a device count of each of the input/output nodes. The method further includes maintaining a device list including the unique device number and device count of each of the input/output nodes. The unique device number may begin with a value of one.

In another specific implementation, in response to reassigning the default device number to the particular input/output node, the method may also include reassigning a new unique device number to each of the input/output nodes having a unique device number with a value less than the initial unique device number assigned to the particular one of the input/output nodes based upon the device list and excluding the particular one of the input/output nodes. The new unique device number may be offset by the device count of the particular one of the input/output nodes.

In yet another specific implementation, the unique device number may begin with a value equal to one plus a count value corresponding to a maximum number of assignable device numbers such as thirty-two, for example. The method may also include assigning the unique device number to each of the input/output nodes by decrementing the unique device number.

Figure 1:
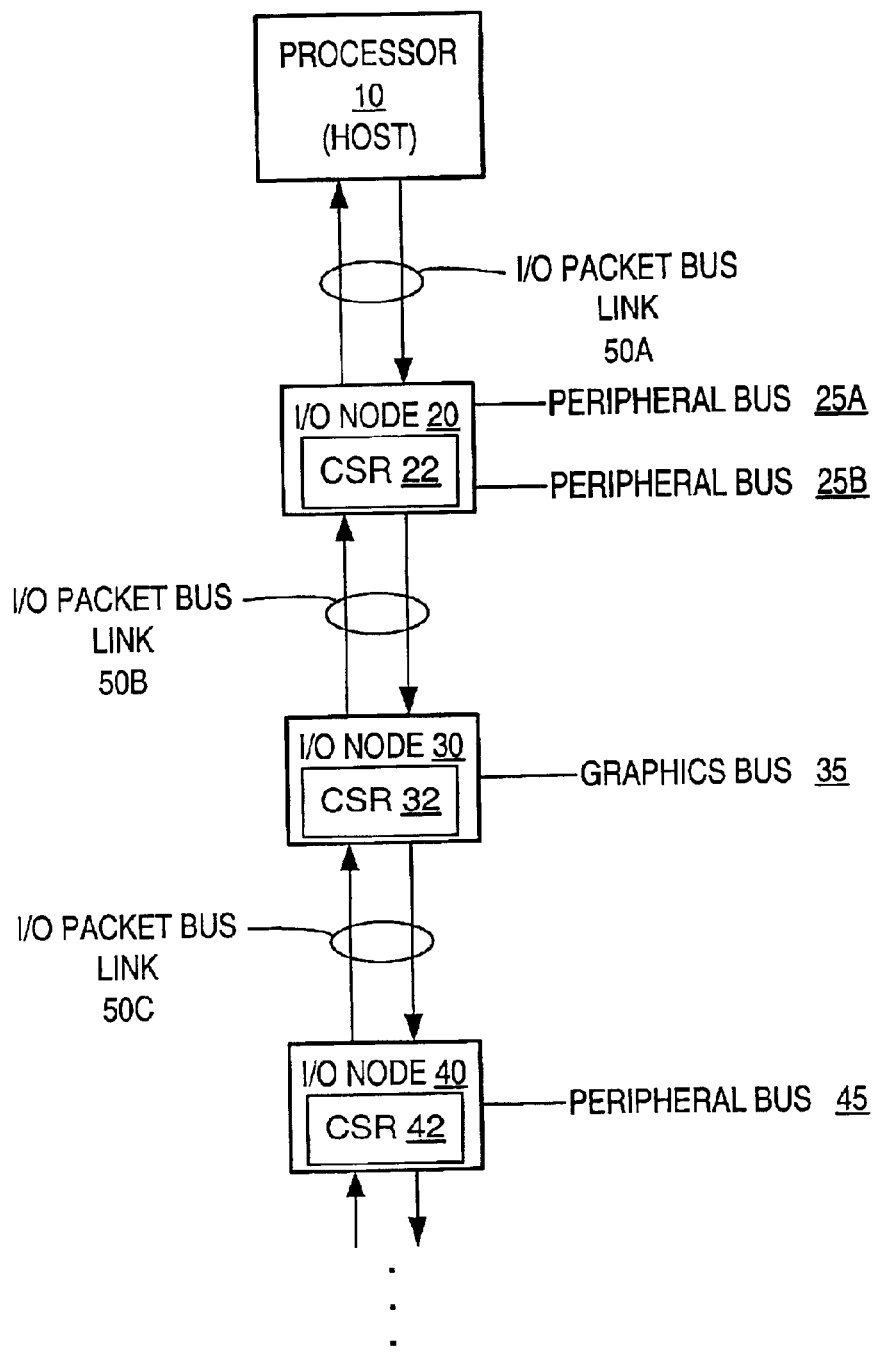
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a block diagram of one embodiment of a computer system is shown. The computer system includes a processor 10. The computer system also includes three I/O nodes numbered 20, 30 and 40 each connected together in a chain by I/O packet bus links 50B and 50C respectively. I/O packet bus link 50A is coupled between host node/processor 10 and I/O node 20. Processor 10 is illustrated as a host node and may include a host bridge for communicating with I/O node 20 via I/O packet bus link 50A. I/O nodes 20, 30 and 40 each include configuration space registers designated CSR 22, 32 and 42, respectively. The I/O packet bus links formed by I/O packet bus 50A–C may be referred to as a point-to-point links. I/O node 20 is connected to a pair of peripheral buses 25A–B. I/O node 30 is connected to a graphics bus 35, while I/O node 40 is connected to an additional peripheral bus 45. It is noted that in other embodiments, other numbers of processors may be used.

Processor 10 is illustrative of, for example, an x86 microprocessor such as an Athlon™ microprocessor. In addition, one example of a packet bus such as I/O packet bus 50 may be compatible with HyperTransport™ technology. Peripheral buses 25A, 25B and 45 are illustrative of a common peripheral bus such as a peripheral component interconnect (PCI) bus and graphics bus 35 is illustrative of an accelerated graphics port (AGP) interconnect, for example. It is understood, however, that other types of processors and buses may be used.

It is noted that while three I/O nodes are shown connected to host processor 10, other embodiments may have other numbers of nodes and those nodes may be connected in other topologies. The chain topology illustrated in FIG. 1 is shown for its ease of understanding.

In the illustrated embodiment, the host bridge of processor 10 may receive upstream packet transactions from downstream nodes such as I/O node 20, 30 or 40. Alternatively, the host bridge of processor 10 may transmit packets downstream to devices such as peripheral devices (not shown) that may be connected to peripheral bus 25A for example.

As packets travel upstream or downstream on the links, the packets may pass through one or more nodes. As used herein, "upstream" refers to packet traffic flow in the direction of the host bridge of processor I/O from an I/O node and "downstream" refers to packet traffic flow in the direction away from the host bridge of processor 10 to an I/O node.

During operation, I/O node 20 and 40 may translate transactions such as PCI or PCIX bus transactions, for example, into upstream packet transactions that travel in I/O streams and additionally may translate downs packet transactions into PCI or PCIX bus transactions. All packets originating at nodes other than the host bridge of processor 10 may flow upstream to the host bridge of processor I/O before being forwarded to any other node. All packets originating at the host bridge of processor 10 may flow downstream to other nodes such as I/O node 20, 30 or 40. Each I/O stream may be identified by an identifier called a Unit ID. It is contemplated that the Unit ID may be part of a packet header or it may be some other designated number of bits in a packet or packets. As used herein, "I/O stream" refers to all packet transactions that contain the same Unit ID and therefore originate from the same node.

To illustrate, a peripheral device on peripheral bus 45 initiates a transaction directed to a peripheral device on peripheral bus 25. The transaction may first be translated into one or more packets with a unique Unit ID and then transmitted upstream. It is noted that each packet may be encoded with specific information which identifies the packet. For example the Unit ID may be encoded into the packet header. Additionally, the type of transaction may also be encoded into the packet header. Each packet maybe assigned a Unit ID that identifies the originating node or device within a node. In the present embodiment, I/O node 20 may not forward packets to a peripheral device on peripheral bus 25 from downstream; the packets are first transmitted upstream to the host bridge of processor 10. The host bridge of processor 10 may then transmit or "reflect" the packets back downstream with a Unit ID of the host bridge of processor 10 where I/O node 20 recognizes and claims the packet for the peripheral device on peripheral bus 25. I/O node 20 may then translate the packets into peripheral bus transactions and transmit the transactions to the peripheral device on peripheral bus 25. Further, transactions originating at the host bridge of processor 10 may also contain the Unit ID of the host bridge of processor 10. In one embodiment, the Unit ID of the host bridge may be zero. This may be particularly true of a host bridge that is compatible with HyperTransport™ technology.

As will be described further below, during system initialization, one or more unique Unit IDs may be assigned to each node in the system, depending upon the number of devices existing within or connected to a node. For example, I/O node 20 may consume two Unit IDs, one for each of its two peripheral bus bridges. The assignment of Unit IDs may be performed by accessing the CSR of each I/O node. Further, depending upon the type of node (i.e. which type of peripherals may be connected to the node), certain Unit ID values may be reserved. For example, as described above, a HyperTransport™ technology compatible host bridge may be assigned a Unit ID number of zero. However, in systems using certain legacy operating systems such as Windows98™, the Unit ID number zero may also be reserved for an AGP device. Thus, systems supporting such legacy operating systems may be configurable to accommodate such restrictions. An example of a HyperTransport™ compatible command register of an I/O node containing the Unit ID is shown below in Table 1 for reference.

It is noted that a detailed description of the configuration access types along with other configuration registers may be found in the latest revision of the HyperTransport™ I/O Link Specification. In addition, a description of configuration accesses may also be found in the latest revision of the PCI Local Bus Specification.

Figure 2:
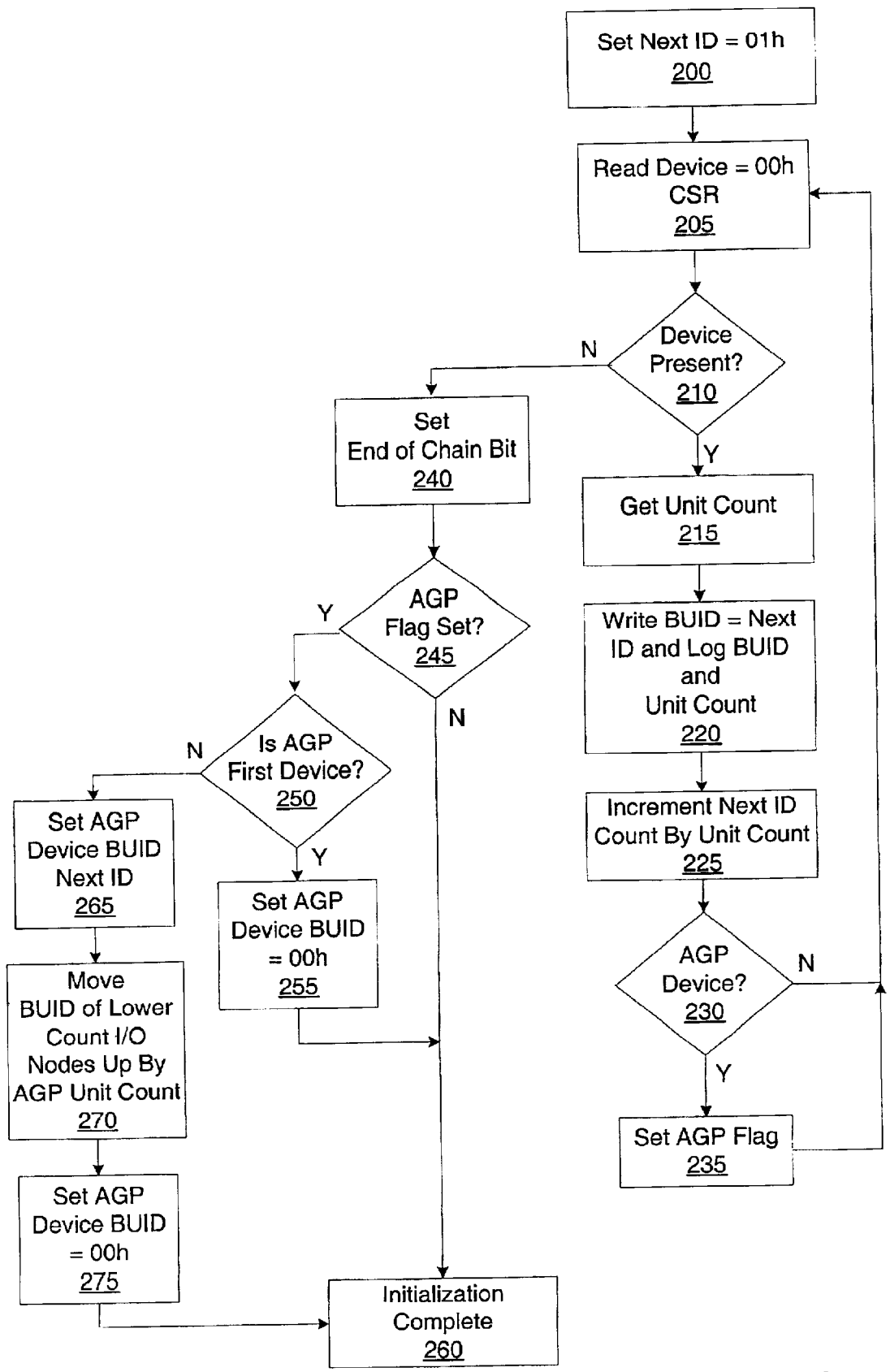
FIG. 2 is a flow diagram illustrating one method of initializing the I/O nodes of a computer system.
Figure 3:
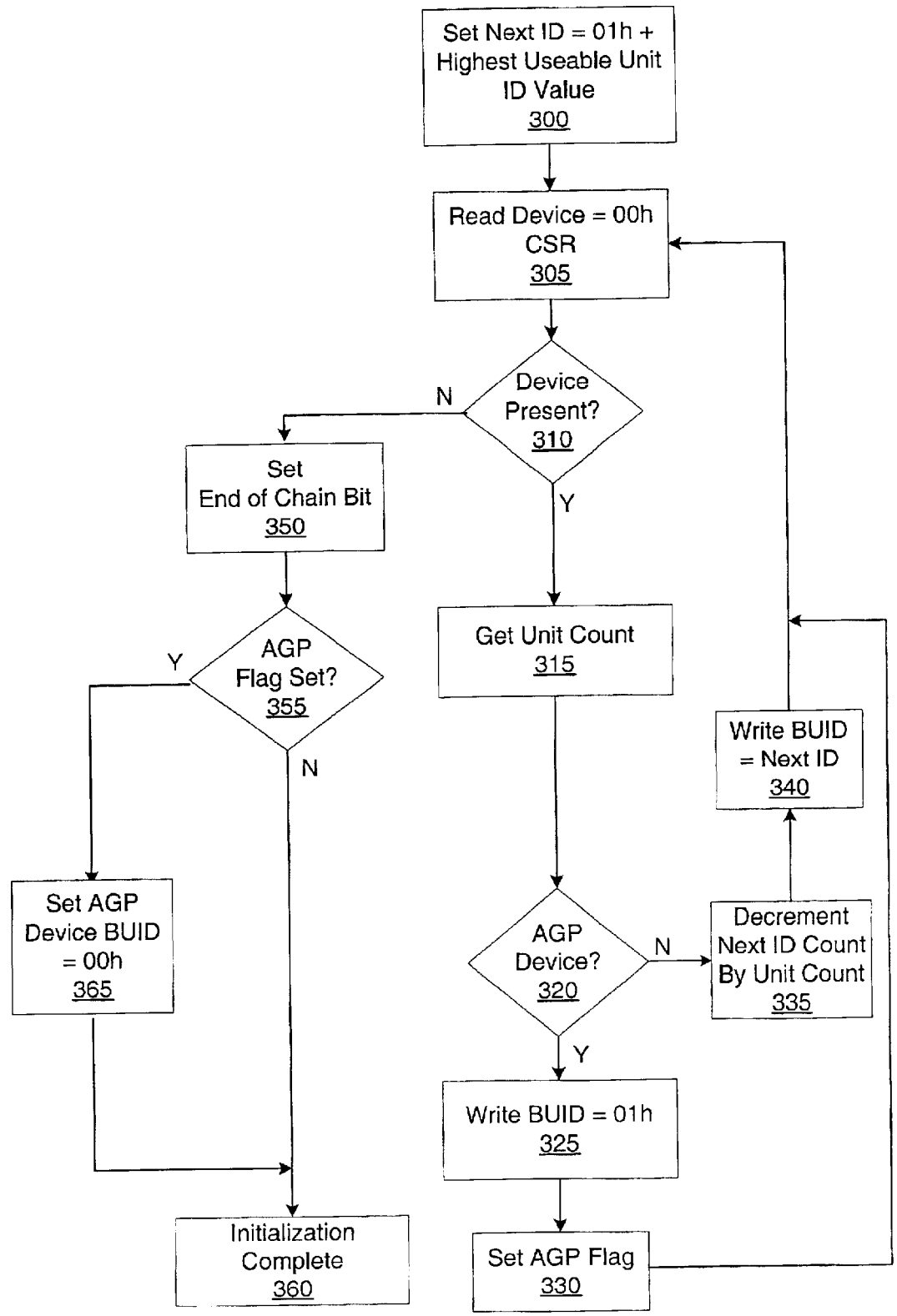
FIG. 3 is a flow diagram illustrating another method of initializing the I/O nodes of a computer system.

FIG. 2 and FIG. 3 each illustrate a method for initializing the I/O nodes of a computer system. Generally speaking, either at start-up or after a cold reset, the host bridge of processor 10 of FIG. 1 may execute software instructions such as BIOS, for example, to initialize the computer system. The host bridge of processor 10 may then access the configuration space of each I/O node in the fabric by performing configuration read accesses and configuration write accesses. As described above, the Unit ID of the nodes in 110 fabric may be assigned during a process that is commonly referred to as enumerating the bus in the I/O system. In the following example, the I/O bus is the chain of I/O nodes coupled together by the I/O packet bus links 50A–C of FIG. 1. In one embodiment, the I/O nodes are HyperTransport™ compatible and contain one or more command registers as shown in Table 1 below. The command register for each device includes such information as the Base Unit ID and the Unit count. The Unit count is indicative of the number of devices which may use a unique Unit ID.

TABLE 1

Command Register

| Type | 15 13 | 12 | 11 | 10 | 9 | 8 | 7 | 6 5 4 3 2 | 1 | 0 |
|---|---|---|---|---|---|---|---|---|---|---|
| Slave/Pri | 000 | Drop on Uninit | Default Direction | Master Host | Unit Count | | | Base UnitID | | |
| Host/Sec | 001 | Drop on Uninit | Inbound EOC Err | Act as Slave | Rsv | Host Hide | Chain Side | Device Number | Double Ended | Warm Reset |

Turning now to FIG. 2, a flow diagram illustrating one method of initializing the I/O nodes of a computer system is shown. Beginning in block 200, the initialization sequence begins by setting a variable designated NextID to 01h. The 'h' after the number identifies the number as a hexadecimal number. The host bridge then performs a configuration read access to device 00h (block 205). It is noted that each I/O node's Base Unit ID (BUID) may be initialized to a default value of 00h upon cold reset. Thus if there are devices coupled to the host bridge, the first I/O node in the chain that has a BUID of 00h may respond to the configuration read access to device 00h (block 210). The first configuration read access may read information to find out the device type and whether the device has a capabilities list.

The host bridge then performs a configuration read access to determine the unit count for the I/O node (block 215) followed by a configuration write access to the BUID register. The host bridge assigns the BUID by writing the value of NextID to the BUID register (block 220). The host bridge also keeps a device list of which Unit IDs are assigned to which devices and the Unit counts of each device (block 220). The NextID is then incremented by the value contained in the Unit count register (block 225). The host bridge continues performing configuration read accesses to determine other information contained in the capabilities list. If the I/O node is determined not to have AGP capability (block 230), the host bridge then performs another configuration read access to a device with a BUID equal to 00h (block 205). The above enumeration process may continue and Unit IDs are assigned to each I/O node in the chain.

Referring back to block 230, if the I/O node is determined to have AGP capability, the host, bridge may set an AGP flag or make an indication of the presence of an AGP device (block 235). The host bridge then continues the enumeration process by performing configuration read accesses to a device with a BUID equal to 00h (block 205) until no devices respond to the configuration read access to a device with a BUID equal to 00h, or another bridge device such as a slave bridge, for example, is encountered (210). In either case, an end of chain bit or other indication may be selected within the host bridge to indicate that the end of the chain has been found (block 240).

Once the end of the chain has been found, the AGP flag or other AGP indication is checked (block 245). If the flag is not set, thus indicating that no AGP devices are present, the enumeration process of the initialization is complete (block 260). Referring back to block 245, if the AGP flag is set however, then the Unit ID and Unit count list is checked to see if the AGP device is the first I/O node the host bridge encounters in the I/O chain (block 250). If the AGP device is the first I/O node in the chain, the host bridge then performs a configuration write access to the I/O node containing the AGP device and sets the BUID to the default value of 00h (block 255). At this point, the enumeration process of the initialization is complete (block 260).

If the AGP device is not the first I/O node in the chain (block 250), the host bridge then performs a configuration write access to the I/O node containing the AGP device and sets the BUID to the value in NextID (block 265). The host bridge then performs a configuration write access to each of the I/O nodes that has a BUID value that is smaller than the BUID value of the I/O node containing the AGP device. Each I/O node's BUID is incremented by the value in the AGP Unit count (block 270). The host bridge then performs another configuration write access to the I/O node containing the AGP device thereby setting the BUID to the default value of 00h (block 275).

Thus for computer systems employing legacy operating systems which require an AGP device to have a BUID of 00h, the above method may configure the I/O nodes' Unit IDs to be compatible. It is noted that although the Base Unit ID of the AGP device is now set to 00h, the AGP device will not use the Unit ID of zero when initiating packet transfers. The AGP device will instead use the other Unit IDs that are assigned to the I/O node as described in the latest revision of the HyperTransport™ I/O Link Specification.

Referring to FIG. 3, a flow diagram illustrating another method of initializing the I/O nodes of a computer system is shown. Beginning in block 300, the initialization sequence begins by setting a variable designated NextID to the highest useable Unit ID plus one. In one embodiment, the highest useable Unit ID is 31d. Thus, NextID may be set to 32d or 20h. The 'd' after the number identifies the number as a decimal number. It is contemplated that other embodiments may have other useable numbers of Unit IDs. The host bridge then performs a configuration read access to device 00h (block 305). As described above, each I/O node's BUID may be initialized to a default value of 00h upon cold reset. Thus if there are devices coupled to the host bridge, the first I/O node in the chain that has a BUID of 00h may respond to the configuration read access to device 00h (block 310). The first configuration read access may read information to find out the device type and whether the device has a capabilities list.

The host bridge then performs a configuration read access to the Unit count register to determine the unit count for the I/O node (block 315). If the I/O node is determined not to have AGP capability (block 320), the value of NextID is decremented by the value in the Unit count register (block 335). The host bridge assigns the BUID by writing the value of NextID to the BUID register (block 340). The host bridge continues performing configuration read accesses to determine other information contained in the capabilities list. The host bridge then performs another configuration read access to a device with a BUID equal to 00h (block 305). The above enumeration process may continue and Unit IDs are assigned to each I/O node in the chain.

Referring back to block 320, if the I/O node is determined to have AGP capability, the host bridge writes a value of 01h to the BUID register of the I/O node containing the AGP device (block 325). An AGP flag is set or other indication of the presence of an AGP device is made (block 330). The host bridge then continues the enumeration process by performing configuration read accesses to a device with a BUID equal to 00h (block 305) until no devices respond to the configuration read access to a device with a BUID equal to 00h, or another bridge device such as a slave bridge, for example, is encountered (310). In either case, an end of chain bit or other indication may be selected within the host bridge to indicate that the end of the chain has been found (block 350).

Once the end of the chain has been found, the AGP flag or other AGP indication is checked (block 355). If the AGP flag is not set, thus indicating that no AGP devices are present, the enumeration process of the initialization is complete (block 360).

Referring back to block 355, if the AGP flag is set however, then the host bridge performs a configuration write access to the I/O node containing the AGP device and sets the BUID to the default value of 00h (block 365). At this point, the enumeration process of the initialization is complete (block 360).

Figure 4:
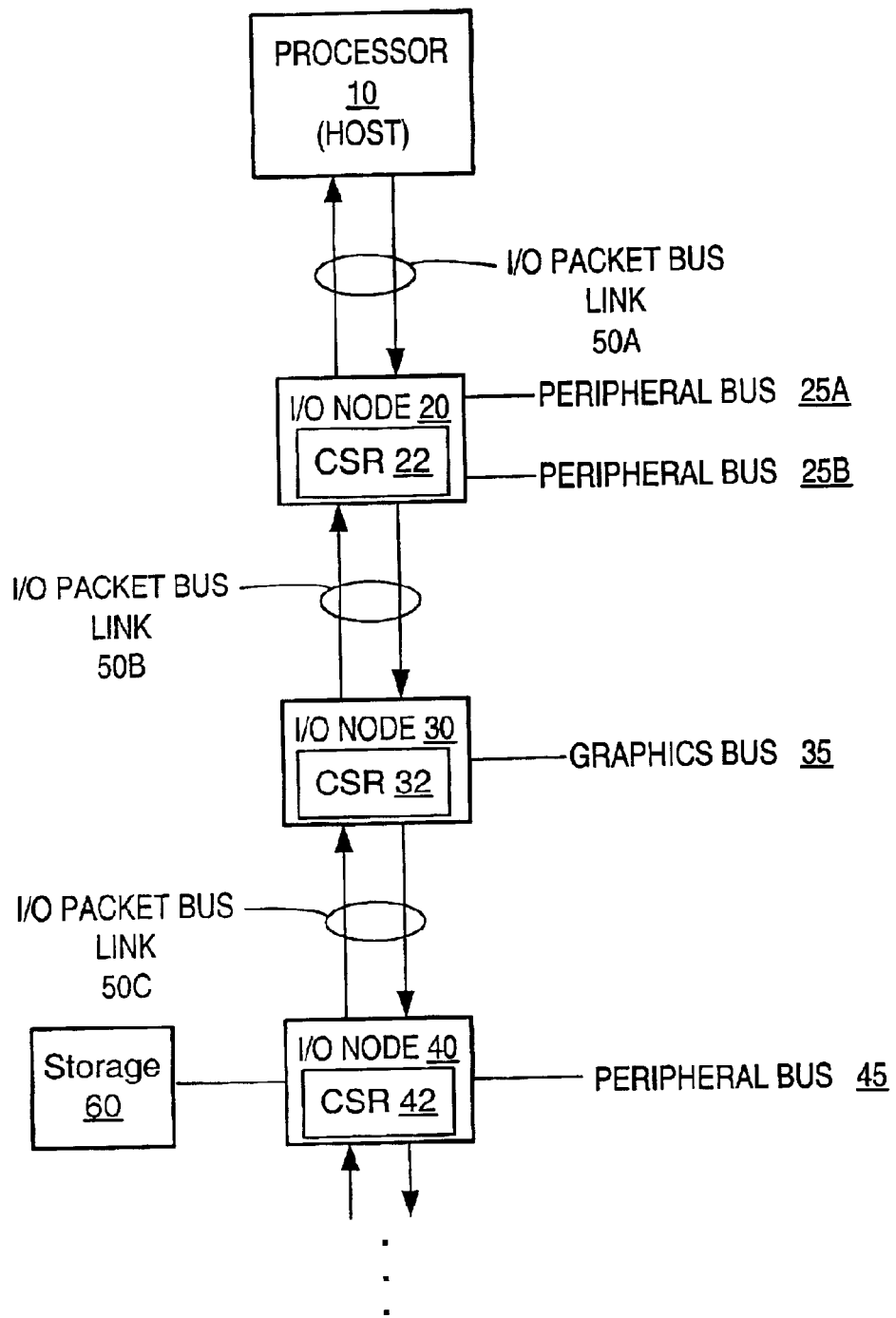
FIG. 4 is a block diagram of the computer system of FIG. 1 including a storage device.

Turning to FIG. 4, a block diagram of the computer system of FIG. 1 including a storage device is shown. Circuit components that that correspond to those shown in FIG. 1 are numbered identically for simplicity and clarity. The computer system of FIG. 4 includes a storage device 60 coupled to I/O node 40. It is noted that storage device 60 is shown coupled to I/O node 40 for exemplary purposes.

Storage device 60 is a memory medium that may be used to store program instructions. The term "memory medium may include an installation medium, e.g., a CD-ROM, or floppy disks 160, a computer system memory such as DRAM, SRAM, EDO DRAM, SDRAM, DDR SDRAM, Rambus RAM, etc., or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. Also, the computer system may take various forms, including a personal computer system, mainframe computer system, workstation, network appliance, Internet appliance, personal digital assistant (DA), television system or other device. In general, the term "computer system" can be broadly defined to encompass any device having a processor which executes instructions from a memory medium.

Various embodiments may further include receiving, sending or storing program instructions and/or data implemented in accordance with the foregoing description upon a carrier medium. Generally speaking, a carrier medium may include storage media or memory media described above, as well as transmission media or signals such as electrical, electromagnetic, or digital signals, conveyed via a communication medium such as network and/or a wireless link.

The program instructions stored within storage device 60 may include BIOS software. The BIOS software, when executed by a processor such as processor 10, for example, may perform the operations as described above in conjunction with the descriptions of FIG. 1 through FIG. 3 above. In one embodiment, when the storage device holds BIOS instructions, the storage device may sometimes be referred to as a firmware read only memory (ROM).

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of assigning device numbers to a plurality of input/output nodes of a computer system, wherein each of said plurality of input/output nodes is initialized to a common default device number, said method comprising:

assigning a unique device number to each one of said plurality of input/output nodes;

determining whether any one of said plurality of input/output nodes includes a graphics port; and reassigning said default device number to a particular one of said plurality of input/output nodes in response to determining that said particular one of said plurality input/output nodes includes a graphics port.

2. The method as recited in claim 1, wherein said reassigning said default device number to a particular one of said plurality of input/output nodes is performed after said assigning said unique device number to each one of said plurality of input/output nodes.

3. The method as recited in claim 2, wherein said plurality of input/output nodes is arranged in a chain.

4. The method as recited in claim 3, wherein said assigning said unique device number to each of said plurality of input/output nodes includes writing said unique device number to each successive input/output node in said chain which responds to a read request to an input/output node having said default device number.

5. The method as recited in claim 2, wherein said default device number is equal to zero.

6. The method as recited in claim 2, wherein each of said plurality input/output nodes includes a first register configured to store a value corresponding to said device number.

7. The method as recited in claim 6, wherein said assigning said unique device number includes programming said device number to said first register.

8. The method as recited in claim 7, wherein said device number is a Unit ID.

9. The method as recited in claim 8, wherein each of said plurality of input/output nodes includes a second register configured to store a value corresponding to a device count of each of said plurality of input/output nodes.

10. The method as recited in claim 9 further comprising determining said device count of each of said plurality of input/output nodes by reading said second register.

11. The method as recited in claim 10 further comprising maintaining a device list including said unique device number and said device count of each of said plurality of input/output nodes.

12. The method as recited in claim 11, wherein said assigning said unique device number includes starting with a value of one.

13. The method as recited in claim 12 further comprising in response to reassigning said default device number to said particular input/output node, reassigning a new unique device number to each of said plurality of input/output nodes having a unique device number with a value less than the initial unique device number assigned to said particular one of said plurality of input/output nodes based upon said device list, excluding said particular one of said plurality of input/output nodes.

14. The method as recited in claim 13, wherein new unique device number is offset by said device count of said particular one of said plurality of input/output nodes.

15. The method as recited in claim 10, wherein said assigning said unique device number includes starting with a value equal to one plus a count value corresponding to a maximum number of assignable device numbers.

16. The method as recited in claim 15, wherein said assigning said unique device number to each of said plurality of input/output nodes includes decrementing said unique device number.

17. The method as recited in claim 16, wherein said maximum number of assignable device numbers is thirty-two.

18. A computer system comprising:
- a processor including a host bridge configured to execute software instructions;
- a plurality of input/output nodes coupled to said processor, wherein each of said plurality of input/output nodes is initialized to a common default device number;
- wherein said host bridge is configured to assign a unique device number to each one of said plurality of input/output nodes;
- wherein said host bridge is further configured to determine whether any one of said plurality of input/output nodes includes a graphics port; and
- wherein said host bridge is further configured to reassign said default device number to a particular one of said plurality of input/output nodes in response to determining that said particular one of said plurality of input/output nodes includes a graphics port.

19. The computer system as recited in claim 18, wherein said host bridge is further configured to reassign said default device number to said particular one of said plurality of input/output nodes after assigning said unique device number to each one of said plurality of input/output nodes.

20. The computer system as recited in claim 19, wherein said plurality of input/output nodes is arranged in a chain.

21. The computer system as recited in claim 20, wherein said host bridge is further configured to write said unique device number to each successive input/output node in said chain which responds to a read request to an input/output node having said default device number.

22. The computer system as recited in claim 19, wherein said default device number is equal to zero.

23. The computer system as recited in claim 19, wherein each of said plurality of input/output nodes includes a first register configured to store a value corresponding to said device number.

24. The computer system as recited in claim 23, wherein said host bridge is further configured to program said device number to said first register.

25. The computer system as recited in claim 24, wherein said device number is a Unit ID.

26. The computer system as recited in claim 25, wherein each of said plurality of input/output nodes includes a second register configured to store a value corresponding to a device count of each of said plurality of input/output nodes.

27. The computer system as recited in claim 26, said host bridge is further configured to determine said device count of each of said plurality of input/output nodes by reading said second register.

28. The computer system as recited in claim 27, wherein said host bridge is further configured to maintain a device list including said unique device number and device count of each of said plurality of input/output nodes.

29. The computer system as recited in claim 28, wherein said host bridge is further configured to assign said unique device number starting with a value of one.

30. The computer system as recited in claim 29, wherein in response to reassigning said default device number to said particular input/output node, said host bridge is further configured to assign a new unique device number to each of said plurality of input/output nodes having a unique device number with a value less than the initial unique device number assigned to said particular one of said plurality of input/output nodes based upon said device list, excluding said particular one of said plurality of input/output nodes.

31. The computer system as recited in claim 30, wherein said new unique device number is offset by said device count of said particular one of said plurality of input/output nodes.

32. The computer system as recited in claim 27, wherein said host bridge is further configured to assign said unique device number staring with a value equal to one plus a count value corresponding to a maximum number of assignable device numbers.

33. The computer system as recited in claim 32, wherein said host bridge is further configured to assign said unique device number to each of said plurality of input/output nodes by decrementing said unique device number.

34. The computer system as recited in claim 33, wherein said maximum number of assignable device numbers is thirty-two.

35. A carrier medium comprising program instructions, wherein the program instructions are computer-executable to perform a method of assigning device numbers to a plurality of input/output nodes of a computer system, wherein each of said plurality of input/output nodes is initialized to a common default device number, said method comprising:
- assigning a unique device number to each one of said plurality of input/output nodes;
- determining whether any one of said plurality of input/output nodes includes a graphics port; and
- reassigning said default device number to a particular one of said plurality of input/output nodes in response to determining that said particular one of said plurality input/output nodes includes a graphics port.

* * * * *